Oct. 2, 1928.
J. W. HILL
1,686,451
VOLTAGE TESTING APPARATUS
Filed June 3, 1926
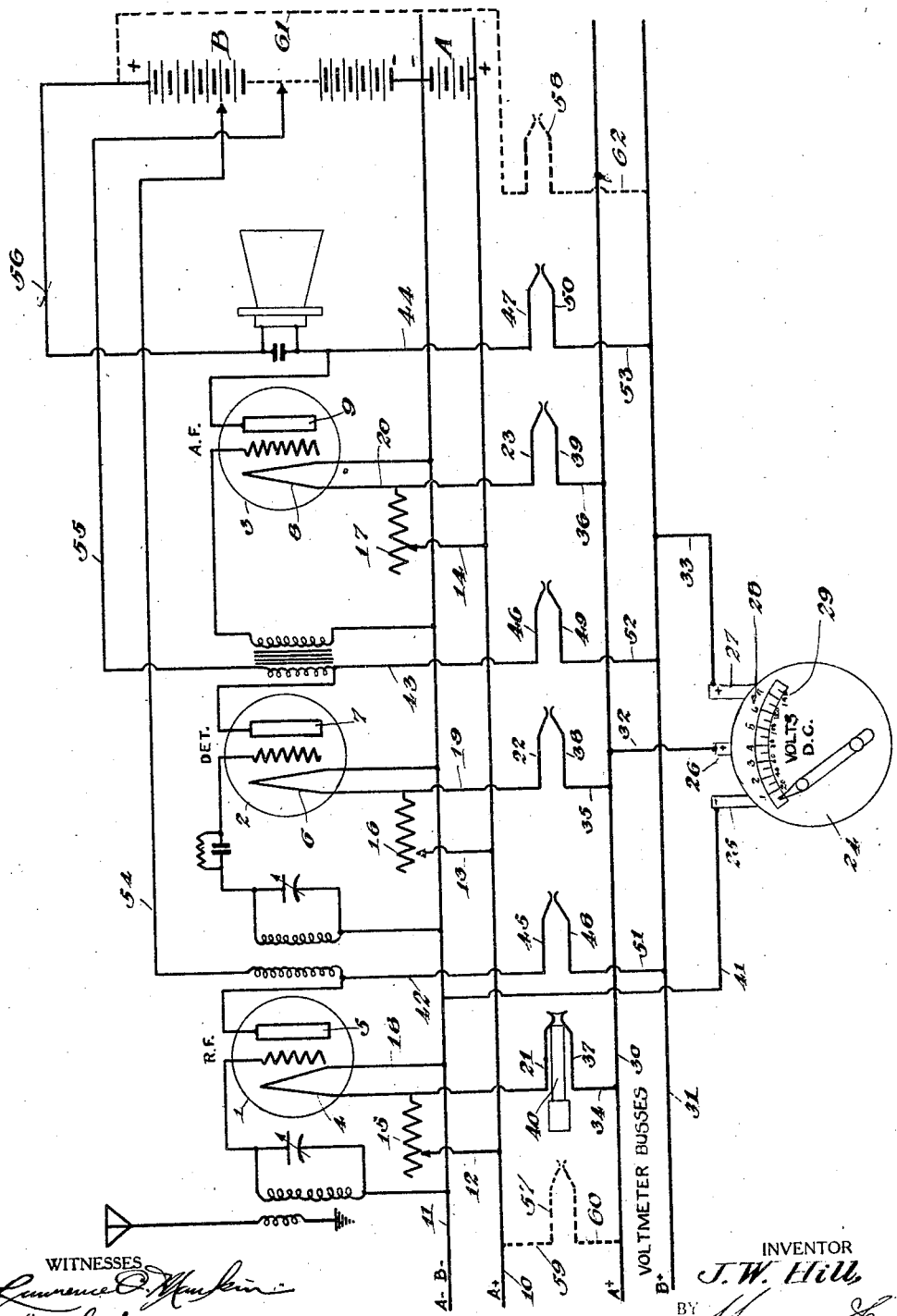

Patented Oct. 2, 1928.

1,686,451

UNITED STATES PATENT OFFICE.

JOHN WILLIAM HILL, OF SALT LAKE CITY, UTAH, ASSIGNOR OF FORTY-NINE ONE-HUNDREDTHS TO JOHN T. CALEY, OF SALT LAKE CITY, UTAH.

VOLTAGE-TESTING APPARATUS.

Application filed June 3, 1926. Serial No. 113,533.

This invention relates to improvements in voltage testing apparatus, and it consists of the constructions, combinations and arrangements herein described and claimed.

An object of the invention is to incorporate an apparatus of simple arrangement in an electrical circuit, more specifically a radio receiver, so that the potential applied to any desired unit, for example, the filament or plate, may be instantly tested from time to time in order to determine whether the voltage is of the desired value.

Other objects and advantages of the invention will appear in the following specification, reference being had to the accompanying drawing, which is a diagram of a radio receiving circuit to illustrate the application of the voltage testing apparatus.

As already indicated in the foregoing general object of the invention the specific testing circuit is intended to be incorporated in a radio receiver thereby forming an integral part thereof and permitting testing of important elements, for example the filament and plate of the respective tubes, from time to time in order to determine whether the voltage is of the required value. Although the testing circuit is herein disclosed as being associated with a radio receiver, it is anticipated that the principles thereof may be embodied in circuits of a different nature. Inasmuch as the testing circuit is incorporated with the radio receiver, the two may be identified as one apparatus.

Reference is made to the drawings. This shows a typical radio receiver, parts of which are involved in the application of the invention. It comprises the radio frequency amplifier tube 1, the detector tube 2, and the audio frequency amplifier tube 3. In the respective instances these tubes include filaments and plates 4, 5; 6, 7, and 8, 9.

Positive and negative busses 10 and 11 supply the current from a familiarly designated "A" battery, for heating the various filaments 4, 6 and 8, the latter conductor also being connected with the "B" battery. The movable conductors 12, 13 and 14 of the rheostats 15, 16 and 17 have common connection with the positive bus 10. The rheostat resistances are connected with wires 18, 19 and 20 which lead to one terminal of the respective filaments and to one prong of suitable spring jacks.

The prongs involved are designated 21, 22 and 23. The remaining terminal of each filament is connected with the negative bus 11 as shown. A voltmeter is incorporated in the receiver in such a manner as to be plainly visible. To this end it is preferably mounted upon the panel. The voltmeter is intended to be of any standard construction, having one negative terminal 25 and two positive terminals 26 and 27. The voltmeter is of the double scale variety, the first scale 28 applying to low voltages such as are dealt with in the filaments, the other scale 29 being readable in relatively high voltages, such as are dealt with in the plate circuits.

Busses 30 and 31 have connection at 32 and 33 with the positive voltmeter terminals 26 and 27. Both busses are positive. The positive voltmeter bus 30 has connections 34, 35 and 36 with the complementary prongs 37, 38 and 39 of the spring jacks mentioned.

Upon desiring to test or regulate the filament voltage of any one of the tubes a plug 40 is inserted in the respective spring jack thereby closing the particular circuit to be tested, if, for example, the potential of the filament 4 is to be tested the plug 40 is inserted into the first jack to make contact between the prongs 21 and 37. Current then flows from the positive conductor or bus 10 over conductor 12, through resistance 15 to the wire 18 where it divides, a portion flowing through the filament 4 back to the negative bus 11, another portion passing through the spring jack and wire 34 to the bus 30, over wire 32 to the positive voltmeter terminal 36, through the voltmeter whence it emerges at the negative terminal 25 and passes over a wire 41 to the negative bus 11. The voltmeter will give a reading on the scale 28, and the movable conductor 12 of the rheostat 15 may be adjusted until the desired voltage value is reached. The plug 40 may be inserted in the particular spring jack from time to time in order to determine any voltage drop whereupon any necessary restoration of voltage can be made by appropriately adjusting the rheostat.

The respective plates 5, 7 and 9 have connections 42, 43 and 44 with prongs 45, 46 and 47 of plate testing jacks. The complementary prongs 48, 49 and 50 have connections 51, 52 and 53 with the positive voltmeter bus 31. The wires conducting current from the customary B-battery to the plates 5, 7 and 9 are designated 54, 55 and 56 in the respective instances.

Upon desiring to test or regulate the voltage of any of the plates the plug 40 is inserted in the respective jacks to close that particular circuit. If, for example, the plate 5 is to be tested, the plug 40 is inserted between the prongs 45 and 48 so that current flows from the positive conductor 54, over the wire 42, through the respective jacks, over wire 51 to the positive voltmeter bus 31, over wire 33 to the positive terminal 27, through the voltmeter whence it emerges at the terminal 25, over wire 41 to the negative A-battery bus 11 back to the source of supply. The voltage impressed upon the plate 5 can be read on the scale 29.

It is obvious that the filament voltage testing circuits might be employed in a radio receiver without necessarily employing the plate testing circuits. It is also possible to employ a similar arrangement for testing the A and B battery voltages directly, the only requirement being two additional jacks 57 and 58 similar to those already shown. These are respectively connected with the busses 10 and 30 by wires 59, 60 and with the positive pole of the B-battery and bus 31 by wires 61, 62. Mention has been made of the possibility of installing the testing circuits in apparatus other than radio receivers. Such installation is intended to apply to radio transmiters, as well. An inspection of the diagram makes it evident that a test of any filament circuit will in no way interfere with any part of the radio receiver circuit other than the one being tested. Only one plug 40 is intended to be used.

A number of the advantages of the testing apparatus may be outlined: The filament and plate voltage of any tube can be known instantly and conveniently by simply inserting the plug 40 in the appropriate jack. Should it be found that the voltage is either above or below the required value the necessary adjustments can be made while the plug is in place. A subsequent insertion of the plug in the same jack will furnish a check on the original voltage adjustment. Experience has determined that signal impulses are received to better advantage with particular filament voltages. Successive tests will soon determine the best filament voltage for receiving impulses from a particular transmitting station, and it seems the obvious thing to do to keep a log or record with information to the foregoing end. The incorporation of the testing circuits increases the value of the radio receiver, and the necessary installation can be made at a comparatively low cost.

While the construction and arrangement of the improved testing apparatus is that of a generally preferred form, obviously, modifications and changes may be made without departing from the spirit of the invention or the scope of the appended claim.

I claim:—

Voltage testing apparatus for radio receivers and the like comprising a voltmeter having a pair of positive terminals and one negative terminal, a pair of positive voltmeter busses connected with the respective positive terminals, an electron-emission tube including a filament and a plate, a normally open positive potential conductor connected with the plate and having a connection leading to one of the positive voltmeter busses, a double-pronged jack interposed in said connection at which said conductor is open, positive and negative filament busses, a connection between one end of the filament and the negative filament bus, a rheostat connected between the other end of the filament and the positive bus, a normally open connection leading from the rheostat to the other positive voltmeter bus, a double pronged jack incorporated in and at which said last connection is open, and a connection between the negative voltmeter terminal and the negative filament supply bus, either of said jacks being capable of receiving a plug for closing a circuit involving either one or the other of the positive voltmeter terminals and the negative terminal, thereby to test either the plate or filament voltage.

JOHN WILLIAM HILL.